March 20, 1951  C. B. LEACH  2,545,787
PRESSURE REDUCING VALVE
Filed Feb. 2, 1944
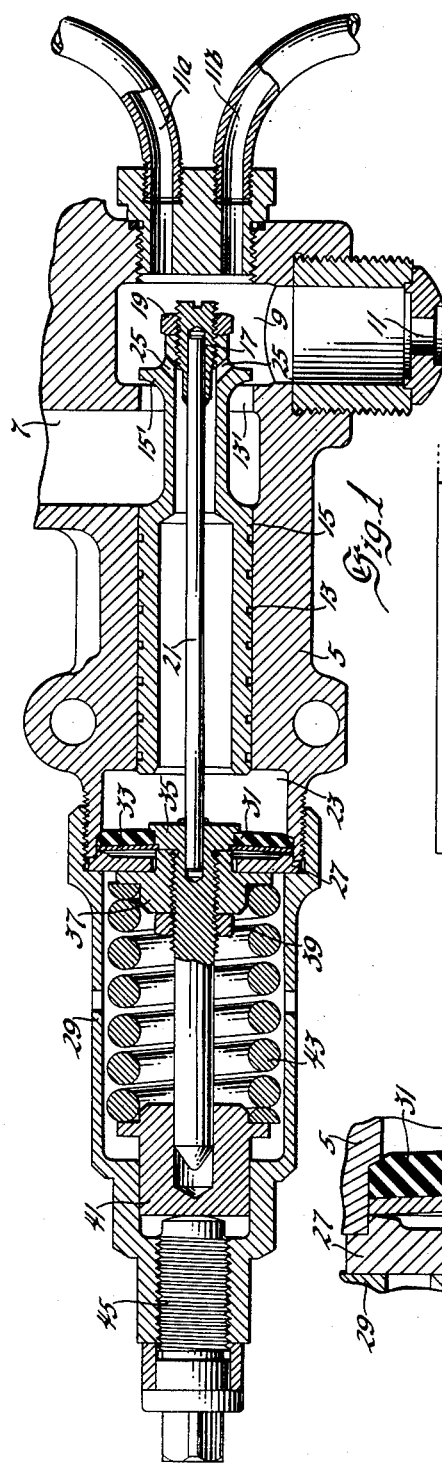
Inventor
Clayton B Leach Patented Mar. 20, 1951

2,545,787

UNITED STATES PATENT OFFICE 2,545,787

PRESSURE REDUCING VALVE

Clayton B. Leach, Pontiac, Mich., assignor to General Motors Corporation, Detroit, Mich., a corporation of Delaware Application February 2, 1944, Serial No. 520,721

8 Claims. (Cl. 50—23)

1

The present invention is the result of an attempt to develop an improved pressure reducing valve. It has been designed to handle a reduction of pressure from about 2800 pounds per square inch prevailing at a pressure source to a pressure of about 400 pounds per square inch which is to be used.

It has been customary in the past to use a spring tending normally to open the passage of the fluid medium as it moves from its high pressure source to its work performing space, the fluid pressure itself acting against the spring to maintain the passage at such a degree of constriction as to produce the required pressure reduction.

The herein described novel reducing valve is of the above type. Its main object is to overcome the flutter which is an objectionable feature of such valves. Other objects and advantages will be understood from a reading of the description which follows.

On the drawing:

Fig. 1 is a transverse section through the improved reducing valve.

Fig. 2 is a similar section on an enlarged scale of a portion of the device shown by Fig. 1.

Fig. 3 is an explanatory diagram.

Numeral 5 represents the body of the valve. It is formed with a high pressure chamber 7 adapted to be connected to a high pressure source which, for example, may contain air under a pressure of 2800 pounds per square inch. Numeral 9 marks a low pressure region through which the adjusted pressure escapes to outlets 11, 11a and 11b. The body is formed with a bore 13, the bore extending as at 13' as a passage between chambers 7 and 9. A hollow valve member 15 is slidably mounted in bore 13 and is formed with a flanged head 15' to variably close the passage 13'. Into the work end of valve member 15 is threaded a plug 17 held in position by a nut 19. Extending from the plug and welded to it is a stem 21. The stem 21 extends through the hollow valve member and into a diaphragm chamber 23 at the remote end of the body 5. Within the flange 15' of valve 15 are apertures 25 affording communication between the low pressure region 9 and the diaphragm chamber 23 by way of the hollow valve member.

Seated against the end of the body 5 is a disk 27. An elongated cap 29 is threaded over the end of the body and the disk 27 is gripped between the cap and the body. A composition diaphragm 31 is seated within the diaphragm chamber on a shoulder of the body. A Belleville spring 33 lies adjacent the composition diaphragm

2

31. Its outer periphery engages an annular abutment on disk 27. At their inner openings, both the elements 31 and 33 contact shoulders on a head 35 which lies within the diaphragm chamber and to which the stem 21 is welded. From the head 35 an integral threaded spindle extends through disk 27 and into the cap 29. An abutment 37 is threaded on the spindle and it is adapted to contact the disk 27. The abutment 37 is held by a nut 39. Slidable in the reduced end of cap 29 is a second abutment 41 between which and abutment 37 is a spiral coil spring 43. The position of part 41 may be adjusted by a positioning member 45 threaded into the end of the cap.

For the purpose intended the spring 43 is so constructed as to have a positive rate of about 965 pounds per inch. This spring rate prevails throughout the working range of the device. It is a known characteristic of a Belleville spring that the relation of its cone height to the thickness of its material may be such as to give it a zero or a negative rate through a predetermined range of action. The present Belleville spring is so constructed and preloaded that throughout its working range it has a negative rate of about 965 pounds per inch.

In operation as the fluid pressure from the source 7 passes into space 9 and through apertures 25, it tends to flatten the Belleville spring and to compress the coil spring thus lifting abutment 37 from the disk 27 and tending to close the gap at 15' and thus effecting the required pressure reduction for the fluid medium passing through outlets 11, 11a and 11b. There is effected a balance such that the air pressure opposing the spring pressure maintains the resultant reduced pressure to within a very few pounds per square inch.

The important feature of the invention is best shown by the diagram where the coil spring is shown as acting with its characteristic uniform positive rate through and beyond the working range. The Belleville spring supplements the coil spring but throughout the working range it has a negative rate which offsets the positive rate of the coil spring giving a substantially zero rate to the combined springs, by which is meant that, throughout the working range the valve, as it moves to and fro, is subject to a uniform spring action and the troublesome flutter is avoided. It will be evident from the drawing that in installation the Belleville spring is given a preload such that those parts of its movement having a positive rate are outside the range of valve operation.

I claim:

1. In a pressure responsive valve, a body having a high pressure region, a low pressure region, a passage therebetween, a valve member movable on said body, means on said valve member to restrict said passage, pressure responsive means constructed and arranged to be responsive to the pressure in one of said regions and directly connected to said valve to move said valve member in one direction, spring means directly connected to said valve member to move the valve member in the opposite direction, said springs mean including a first spring having a positive load-deflection rate within the range of valve actuation and a second spring acting in parallel with the first spring and having a negative load-deflection rate substantially equal to the rate of said first spring within the range of valve actuation.

2. The invention defined by claim 1, said second spring being a Belleville washer.

3. In a pressure responsive valve, a valve body having a passage therethrough, a valve member movable in said body, means on said valve member to restrict said passage, a chamber communicating with said passage, said chamber having a flexible wall comprising a diaphragm and a negative load-deflection rate spring, means connecting said spring to said valve member, and a positive load-deflection spring operatively connected to said valve member acting in parallel with said first spring, and the rates of said springs being substantially equal within the range of valve actuation.

4. A pressure responsive valve having a body with a fluid conduit therethrough, a seat in said conduit, a fluid chamber in said body extending laterally from said conduit, a valve member slidably mounted in said chamber and having a portion extending into said conduit to engage said seat, a slidable seal between the walls of said chamber and said valve member, a passage in said valve member connecting said conduit with said chamber beyond said valve member, a diaphragm and a Belleville spring constituting an end wall of said chamber, said spring being connected to said valve member, and being biased to oppose the fluid pressure in said chamber, said Belleville spring having a negative load-deflection rate in the operative range of said valve, a second spring connected to said valve member and acting in parallel with said Belleville spring and having a positive load-deflection rate in the operative range, the rates of said springs being substantially equal within the range of valve actuation.

5. In a pressure responsive valve, a body having a high pressure region, a low pressure region, a passage therebetween, a valve member movable on said body, means on said valve member to restrict said passage, pressure responsive means constructed and arranged to be responsive to the pressure in one of said regions and directly connected to said valve to move said valve member in one direction, spring means directly connected to said valve member to move the valve member in the opposite direction, said spring means including a first spring having a positive load-deflection rate within the range of valve actuation and a second spring acting in parallel with the first spring and having a negative load-deflection rate within the range of valve actuation, said spring means having a load-deflection rate of substantially zero, and said second spring having a negative load-deflection rate substantially equal to the positive load-deflection rate of the first spring.

6. In a pressure responsive valve, a body having a high pressure region, a low pressure region, a passage therebetween, a valve member movable on said body, means on said valve member to restrict said passage, pressure responsive means constructed and arranged to be responsive to the pressure in one of said regions and directly connected to said valve to move said valve member in one direction, spring means directly connected to said valve member to move the valve member in the opposite direction, said spring means including a first spring having a positive load-deflection rate within the range of valve actuation and a second spring acting in parallel with the first spring and having a negative load-deflection rate substantially equal to the rate of said first spring within the range of valve actuation and a portion of said spring means engaging said pressure responsive means.

7. In a pressure responsive valve, a valve body having a passage therethrough, a valve movable in said body, means on said valve member to restrict said passage, a chamber communicating with said passage, said chamber having a flexible wall comprising a diaphragm and a negative load-deflection spring, means connecting said spring to said valve member, and a positive load-deflection spring operatively connected to said valve member acting in parallel with said first spring, the rates of said springs being substantially equal within the range of valve operation, and said negative load-deflection spring comprising a Belleville washer.

8. In a pressure responsive valve, a valve body having a passage therethrough, a valve movable in said body, means on said valve member to restrict said passage, a chamber communicating with said passage, said chamber having a flexible wall comprising a pressure responsive means and a negative load-deflection spring, means connecting said spring to said valve member, and a positive load-deflection spring operatively connected to said valve member acting in parallel with said first spring, the rates of said springs being substantially equal within the range of valve operation.

CLAYTON B. LEACH.

REFERENCES CITED

The following references are of record in the file of this patent:

UNITED STATES PATENTS

| Number | Name | Date |
|---|---|---|
| 65,254 | Meggenhofen | May 28, 1867 |
| 94,748 | Holly | Sept. 14, 1869 |
| 219,625 | Dickey | Sept. 16, 1879 |
| 627,390 | Cash | June 20, 1899 |
| 646,064 | Baylis | Mar. 27, 1900 |
| 1,107,612 | Hodge | Aug. 18, 1914 |
| 1,178,802 | Hamlin | Apr. 11, 1916 |
| 1,984,792 | Ford | Dec. 18, 1934 |
| 2,013,369 | Turner | Sept. 3, 1935 |
| 2,137,025 | Niesemann | Nov. 15, 1938 |
| 2,308,475 | Fawkes | Sept. 14, 1943 |

FOREIGN PATENTS

| Number | Country | Date |
|---|---|---|
| 7,728 | Great Britain | Mar. 28, 1911 |